US005192047A

United States Patent [19]

Lisi et al.

[11] Patent Number: 5,192,047

[45] Date of Patent: Mar. 9, 1993

[54] TETHERABLE FRAME FOR, AND IN COMBINATION WITH, A SUBMERSIBLE MIXER

[75] Inventors: Dominic A. Lisi, Trumbull; Robert L. Deilus, Newtown, both of Conn.

[73] Assignee: ITT Corporation, New York, N.Y.

[21] Appl. No.: 827,174

[22] Filed: Jan. 28, 1992

[51] Int. Cl.$^{5}$ .............................................. F16M 3/00

[52] U.S. Cl. ................................... 248/676; 248/125; 248/176; 366/262

[58] Field of Search ............... 248/676, 677, 678, 669, 248/297.3, 295.1, 328, 327, 188.2, 354.5, 354.6, 132, 176, 146, 125; 366/262, 263

[56] References Cited

U.S. PATENT DOCUMENTS

| | | | |
|---|---|---|---|
| 3,856,272 | 12/1974 | Ravitts | 366/266 X |
| 4,687,175 | 8/1987 | Szendroi et al. | 248/207 X |
| 5,117,402 | 5/1992 | Myers et al. | 248/676 X |

FOREIGN PATENT DOCUMENTS

| | | | |
|---|---|---|---|
| 1394222 | 2/1965 | France | 248/676 |

*Primary Examiner*—Ramon O. Ramirez
*Attorney, Agent, or Firm*—Menotti J. Lombardi

[57] ABSTRACT

Three, spaced-apart, elongate limbs, each fixed at one end to a planar, rectilinear base, and two thereof mounting a shackle-receiving, mixer-mounting plate, at the opposite ends thereof, define the frame as an open support for a mixer. The mixer is fastened to an arm extending inwardly of the frame from one of the limbs, and to the mounting plate. A cone, centrally fixed on the base, assures fully wide dispersion of the fluid.

19 Claims, 2 Drawing Sheets

TETHERABLE FRAME FOR, AND IN COMBINATION WITH, A SUBMERSIBLE MIXER

This invention pertains to apparatus for agitating fluids, principally liquids, and in particular to mixers, for agitating liquids in tanks or reservoirs, which are submersible in the liquids, and to means for supporting such mixers for submersion.

BACKGROUND OF THE INVENTION

In the prior art there obtain submersible mixers and means for supporting them in tanks or reservoirs of liquid. Exemplary thereof is the arrangement disclosed in U.S. Pat. No. 4,687,175, issued on Aug. 18, 1987, to Balint Szendroi, et al, for an Attaching Device. The latter discloses a mast system which is emplaced in the tank or reservoir, and to which the mixer is attached. The mixer can be articulated, relative to the mast system, and caused to translate therealong as well. The same is very versatile, and equal to substantially any fluid agitating requirement. There are fluid mixing needs, however, which do not warrent the expense and sophistication of such mixer/mast systems. Adequate for such needs would be a submersible mixer which can be supported in a frame and lowered into the tank or reservoir by means of a tethering cable, or the like, of simple structure.

U.S. Pat. No. 3,856,272, issued to Richard B. Ravitts, on Dec. 24, 1974, sets forth a floating mixer. The same does not accommodate for the submersion of the mixer wholly with tank- or reservoir-confined liquid. U.S. Pat. No. 4,410,279, issued on Oct. 18, 1983 to Michael Howden, et al, for an Apparatus for Agitating the Contents of Storage Tanks; U.S. Pat. No. 4,456,424, for an Underwater Sand Pump, issued to Toshinobu Araoka, on Jun. 26, 1984; and the U.S. Pat. No. 4,746,221, issued on May 24, 1988, to Katsuji Okumura, for a Stirrer for Use in Liquid Storage Tanks all set forth submersible agitators for liquids which are tetherable. However, the mixer or agitator housings and allied structures thereof are quite complex, and likely to be as expensive as the aforesaid mixer/mast system, if not more expensive.

What has been an unmet need is for a simple, inexpensive and versatile tetherable frame for a submersible mixer, and an available package of such a frame and mixer replaceably mounted thereto.

It is an object of this invention to set forth just such a simple, inexpensive frame, which is versatile and tetherable, for supporting a submersible mixer thereon, and a combination of such a frame with a submersible mixer mounted thereto.

Particularly it is an object of this invention to set forth a tetherable frame for a submersible mixer, comprising elongate limb means for mounting a submersible mixer thereto; wherein said limb means has, at one end thereof, tether-attaching means and, at the opposite end thereof, a base, and means, intermediate said base and said attaching means, means for removably fastening a submersible mixer thereto.

It is also an object of this invention to set forth, in combination, a submersible mixer and a tetherable frame therefor, comprising a base; and a plurality of spaced-apart, parallel and elongate limbs; wherein each of said limbs is joined, at one end thereof, to said base; tether-attaching means coupled to the opposite ends of a pair of said limbs; and a submersible mixer removably fastened to said limbs intermediate said base and said attaching means.

SUMMARY OF THE INVENTION

The aforesaid objects of this invention, as well as the novel features thereof, which will become apparent hereinafter, are accomplished by the provisioning of a simple frame formed of length-adjustable beams fixed at one end of each to a planar base, and fixing a mounting plate, having a shackle extending therefrom, at the opposite ends of a pair of the beams. The plate, and a further beam have accommodation for replaceably mounting a mixer thereto.

BRIEF DESCRIPTION OF THE DRAWINGS

The above-mentioned and other features and objects of this invention will become more apparent by reference to the following description taken in conjunction with the accompanying figures, in which.

DETAILED DESCRIPTION OF THE PREFERRED EMBODIMENT

Figure 3:
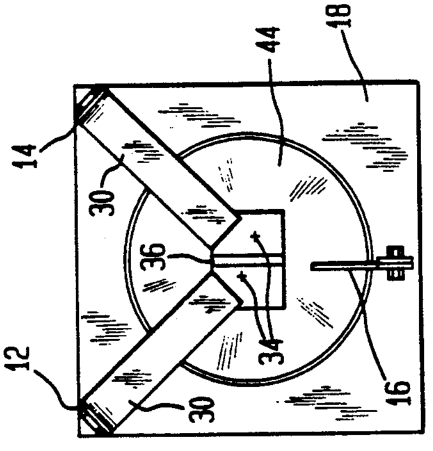
FIG. 3 is a top or plan view of the frame, the same taken from the top of FIG. 2.
Figure 2:
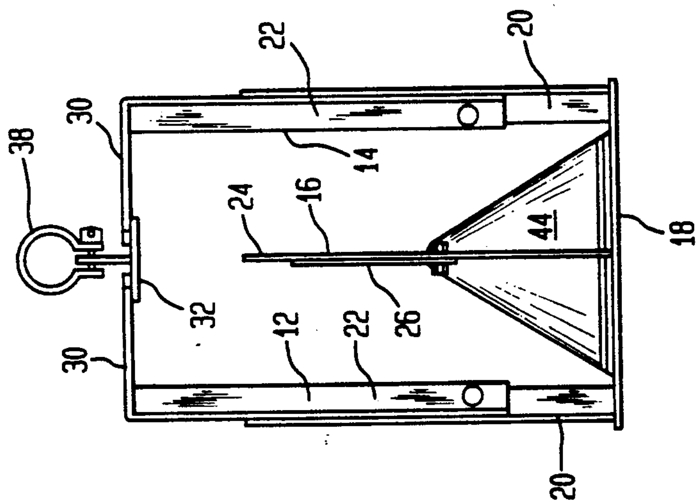
FIG. 2 is a front, elevational view of the frame of FIG. 1.
Figure 1:
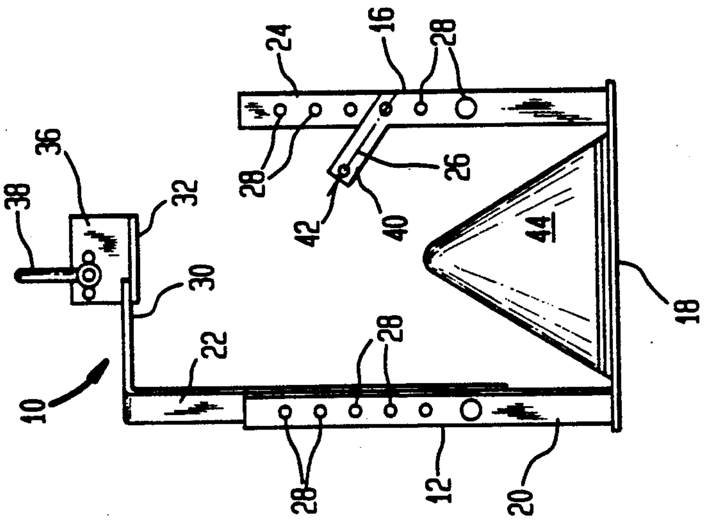
FIG. 1 is a side, elevational illustration of the novel frame, according to an embodiment thereof.

As shown in FIGS. 1, 2 and 3, the novel frame 10 has three limbs 12, 14 and 16 fixed at one end of each to a planar, rectilinear base 18. The limbs comprise supporting members for a submersible mixer, and are formed of beams 20, 22, 24 and 26. The beams are fastened together by bolts (only three are shown). Graduated bolt holes 28 provide for a selective adjustment of the length of the limbs, as shown in FIG. 1. Beams 22 have arms 30, at uppermost portions thereof, which are parallel with the base 18. Together, arms 30 have a mounting plate 32 fixed thereto by welding (or the like). Plate 32 has mixer mounting holes 34 formed therein, and an apertured lug 36 upstanding therefrom and welded thereto. A tethering shackle 38 is fixed to the lug 36.

Beam 24 also has an arm 40 extending therefrom at an oblique angle relative to the base 18. In an outer end thereof, arm 40 has a mixer mounting hole 42 formed therein. Centrally located upon the base 18 is fixed a cone 44; the same is provided to assure a uniform deflection of fluid in the mixing thereof throughout a full three hundred and sixty degrees of dispersion.

Figure 4:
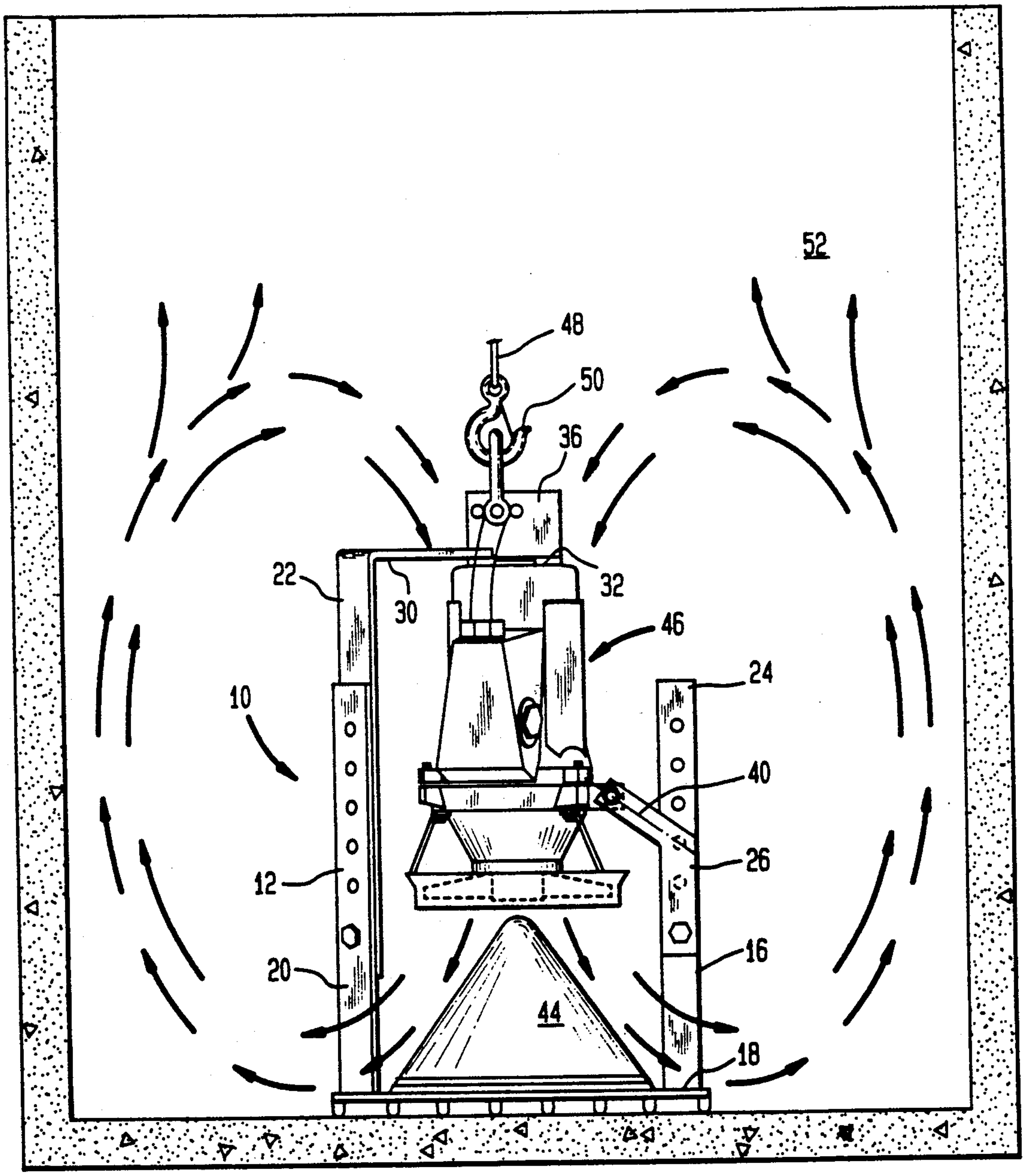
FIG. 4 is a view like that of FIG. 1, showing the mixer in place on the frame, and a tethering cable and hook coupled to the shackle.

FIG. 4 shows a mixer 46 fastened in the frame 10. Fasteners in holes 34, in the plate 32, and hole 42 in arm 40, hold the mixer 46 secure in the frame. A cable 48 (only a portion being shown), joined to a safety hook 50 which engages the shackle 38, provides for the tethering of the frame 10 and mounted mixer 46, within the tank or reservoir 52.

As depicted by the arrows in FIG. 4, the cone 44, set within a substantially open frame 10, accommodates for full, virtually unobstructed circulation of fluid. The mixer 46 is not walled in, in a cylinder or chamber of any sort. It is surrounded, simply, by narrow beams at three, spaced-apart locations. Consequently, the fluid manifests a free through-flow, and the cone 44 effects the full dispersion thereabout. By means of the cable 48, the frame 10 and mixer 46 can be placed anywhere in the reservoir 52 and, of course, raised and lowered thereby. The frame is sturdy, and defines a secure mount for the mixer 46. The base 18 offers a sure footing for the unit, and counteracts or cancels out any reaction forces arising from the thrust of the mixer.

While we have described our invention in connection with a specific embodiment thereof, it is to be clearly understood that this is done only by way of example and not as a limitation to the scope of our invention as set forth in the objects thereof and in the appended claims.

We claim:

1. A tetherable frame for a submersible mixer, comprising:

elongate limb means for mounting a submersible mixer thereto, said limb means comprises a plurality of spaced-apart, parallel limbs, each thereof being joined, at one end, to said base; wherein a pair of said limb means have, at one end thereof, tether-attaching means and, at the opposite end thereof, a base, and means, intermediate said base and said attaching means, means for removably fastening a submersible mixer thereto.

2. A tetherable frame for a submersible mixer, according to claim 1, wherein: said base comprises a planar platform; and further including means mounted on said platform for uniformly deflecting fluid.

3. A tetherable frame for a submersible mixer, according to claim 1, wherein:

said limbs are upstanding from, and right-angularly disposed relative to, said base.

4. A tetherable frame for a submersible mixer, according to claim 1, wherein:

said pair of said limbs means, of said plurality thereof, have (a) upright members, and (b) arms disposed in parallel with said base, and extending inwardly of said frame.

5. A tetherable frame for a submersible mixer, according to claim 4, wherein:

terminal ends of said arms, together, have a mounting plate fixed thereto.

6. A tetherable frame for a submersible mixer, according to claim 4, wherein:

said members each comprise a plurality of beams fastened together; and said beams have means for selectively adjusting the length of said members.

7. A tetherable frame for a submersible mixer, according to claim 3, wherein:

one limb, of said plurality thereof, has an arm extending inwardly of said frame, and at an oblique angle relative to said base.

8. A tetherable frame for a submersible mixer, according to claim 7, wherein:

said arm has means for fastening a submersible mixer thereto.

9. A tetherable frame for a submersible mixer, according to claim 7, wherein:

said one limb comprises a plurality of beams fastened together; and said beams have means for selectively adjusting the length of said one limb.

10. A tetherable frame for a submersible mixer, according to claim 5, wherein:

said tether-attaching means comprises a shackle joined to said plate.

11. A tetherable frame for a submersible mixer, according to claim 2, wherein:

said fluid deflecting means comprises a cone.

12. In combination, a submersible mixer and a tetherable frame therefor, comprising:

a base; and a plurality of spaced-apart, parallel and elongate limbs; wherein each of said limbs is joined, at one end thereof, to said base;

tether-attaching means coupled to the opposite ends of a pair of said limbs; and a submersible mixer removably fastened to said limbs intermediate said base and said attaching means.

13. The combination, according to claim 12, wherein:

said base comprises a planar platform; and further including means mounted on said platform for uniformly deflecting fluid.

14. The combination, according to claim 13, wherein:

said limbs are upstanding from, and right-angularly disposed relative to, said base.

15. The combination, according to claim 13, wherein:

said pair of limbs have (a) upright members, and (b) arms disposed in parallel with said base, and extending inwardly of said frame.

16. The combination, according to claim 15, wherein:

terminal ends of said arms, together, have a mounting plate fixed thereto; and said submersible mixer is fastened to said plate.

17. The combination, according to claim 15, wherein:

said members each comprise a plurality of beams fastened together; and said beams have means for selectively adjusting the length of said members.

18. The combination, according to claim 14, wherein:

one limb, of said plurality thereof, has an arm extending inwardly of said frame, and at an oblique angle relative to said base.

19. The combination, according to claim 18, wherein:

said submersible mixer is fastened to said arm.

* * * * *